United States Patent [19]
Fujita

[11] Patent Number: 6,031,950
[45] Date of Patent: Feb. 29, 2000

[54] WAVELENGTH-SELECTIVE OPTICAL DEVICE HAVING AN ADJUSTABLE GRATING FOR REDUCING TRANSMISSION LOSSES

[75] Inventor: Masayuki Fujita, Tokyo, Japan

[73] Assignee: NEC Corporation, Tokyo, Japan

[21] Appl. No.: 09/013,909

[22] Filed: Jan. 27, 1998

[30] Foreign Application Priority Data

Jan. 28, 1997 [JP] Japan ..................... 9-014285

[51] Int. Cl.$^7$ ....................................... G02B 6/34
[52] U.S. Cl. ................................................. 385/37
[58] Field of Search ........................... 385/14, 16, 30–37, 385/24, 50, 12, 13, 3, 23; 359/271, 569, 558, 591, 109, 110, 130; 372/6, 45, 8, 99, 102

[56] References Cited

U.S. PATENT DOCUMENTS

| | | |
|---|---|---|
| 4,482,248 | 11/1984 | Papuchon et al. . |
| 4,671,603 | 6/1987 | McQuoid et al. . |
| 4,781,428 | 11/1988 | Epworth et al. . |
| 4,940,314 | 7/1990 | Hecht . |
| 4,986,623 | 1/1991 | Sorin . |
| 5,007,705 | 4/1991 | William et al. ............................. 385/37 |
| 5,009,484 | 4/1991 | Gerritsen ................................... 385/37 |
| 5,058,977 | 10/1991 | Sorin . |
| 5,142,914 | 9/1992 | Kusakabe et al. ........................ 73/723 |
| 5,225,942 | 7/1993 | Ikeno . |
| 5,469,520 | 11/1995 | William et al. ............................. 385/37 |
| 5,504,772 | 4/1996 | Deacon et al. . |
| 5,557,442 | 9/1996 | Huber ......................................... 359/179 |
| 5,675,674 | 10/1997 | Weis . |
| 5,726,785 | 3/1998 | Chawki et al. ........................... 359/130 |
| 5,771,250 | 6/1998 | Shigehara et al. ........................... 372/6 |

FOREIGN PATENT DOCUMENTS

| | | |
|---|---|---|
| 57-135929 | 8/1982 | Japan . |
| 60-242422 | 12/1985 | Japan . |
| 63-311319 | 12/1988 | Japan . |
| 64-72125 | 3/1989 | Japan . |
| 1-196189 | 8/1989 | Japan . |
| 5-5805 | 1/1993 | Japan . |
| 5-502951 | 5/1993 | Japan . |
| 7-198936 | 8/1995 | Japan . |
| 8-101310 | 4/1996 | Japan . |
| 9-21984 | 1/1997 | Japan . |
| 10-505920 | 6/1998 | Japan . |
| WO 86/01303 | 2/1986 | WIPO . |
| WO8601303A | 2/1986 | WIPO . |
| WO 94/19713 | 9/1994 | WIPO . |
| WO9419713A | 9/1994 | WIPO . |

*Primary Examiner*—Akm E. Ullah
*Attorney, Agent, or Firm*—Whitham, Curtis & Whitham

[57] ABSTRACT

A wavelength-selective optical device includes an optical fiber having a grating portion where a refractive index of medium is periodically changed; a light input portion where light is supplied to the optical fiber; a light output portion where light with a specific wavelength to be output from the optical fiber is taken out; and means for applying a stress to the grating portion. By adjusting the stress applied to the grating portion, a reflection center wavelength of the grating portion is changed to reduce transmission losses.

6 Claims, 2 Drawing Sheets

WAVELENGTH-SELECTIVE OPTICAL DEVICE HAVING AN ADJUSTABLE GRATING FOR REDUCING TRANSMISSION LOSSES

FIELD OF THE INVENTION

This invention relates to a wavelength-selective optical device used for a wavelength multiplexing optical communication system, and more particularly to, a wavelength-selective optical device used to selectively extract light with a specific wavelength from wavelength-multiplexed signal light where several lights with different wavelengths are multiplexed.

BACKGROUND OF THE INVENTION

In a wavelength multiplexing optical system where several signal lights with different wavelengths are transmitted in an optical fiber, a band pass filter in needed to extract signal light with a desired wavelength from the transmitted signal light in a receiving unit for signal light. However, when a transmitted center wavelength of the band pass filter is fixed, the transmission loss of the band pass filter may be highly increased due to a variation of wavelength in the signal light caused by a time dependent variation or temperature variation of a light source for transmission. Therefore, it is desirable that a band pass filter used in the receiving unit is a wavelength-selective optical device whose transmitted center wavelength can be changed.

Japanese patent application laid-open No. 7-198936 (1995) discloses a wavelength-selective optical device which is composed of optical filter that dielectric multilayer film is coated on convex glass, the optical filter being inserted between two opposing optical fibers, and a piezoelectric actuator which changes the position of the convex glass to change the incidence angle of light to the filter film so as to change the transmitted center wavelength of the filter film.

Japanese patent application laid-open No. 5-005805 (1993) discloses a wavelength-selective optical device which is composed of an optical filter plate and an optical path correcting plate which are inserted between two opposing optical fibers, wherein the incidence angle of light is changed by the rotation of the optical filter plate to change the transmitted center wavelength and the position change of lightbeam due to the rotation of the optical filter plate is corrected by the rotation of the optical path correcting plate.

Further, Japanese patent application laid-open No. 56-162701 (1981) discloses a wavelength-selective optical device which uses a property that the rotation angle of a rotatory material is varied depending upon a wavelength of light. Also, Japanese patent application laid-open No. 8-110487 (1996) discloses a wavelength-selective optical device where input light is supplied to a polarization separating prism to transmit only specific linearly polarized light, and an optical filter plate, a quarter-wave plate and a reflection plate are inserted on the optical path of the transmitted light, wherein the optical filter plate is rotated to change the transmitted center wavelength. In this device, light transmitted through the polarization separating prism is transmitted by two times, each time in the different direction, through the optical filter plate. Thereby, a position change of optical pass is corrected. Therefore, the device has a merit that the coupling loss between input and output fibers by the rotation of the optical filter plate is not changed. Also, it has a further merit that a steep transmission loss spectrum with a narrow half width can be obtained since light is transmitted by two times through the optical filter plate.

However, the conventional wavelength-selective optical devices have several problems described below. In the device disclosed in Japanese patent application laid-open No. 7-198936, there is a problem that the movement of the optical filter causes a change in the optical path of light beam and the coupling loss between input and output fibers is therefore increased. Further, the transmittance of the optical filter of dielectric multilayer film is generally varied depending upon a change in the polarization state of incident light with an increase in incidence angle of light. Namely, with an increase in incidence angle of light, the polarization-dependent loss (PDL) of the optical filter due to the change in the polarization state of incident light is increased.

In the device disclosed in Japanese patent application laid-open No. 5-005805, there is a problem that the composition is complicated since the optical path correcting plate is needed other than the optical filter plate. Also, there is a further problem that the adjustment control is complicated since the rotation angle of the optical path correcting plate needs to be controlled corresponding to the rotation quantity of the optical filter plate. Further, like the above device, there is a problem that PDL is increased with an increase in incidence angle of light to the optical filter and optical path correcting plate.

In the device disclosed in Japanese patent application laid-open No. 56-162701, the resolution capability for wavelength separation is no more than a few nano-meters due to the wavelength dependency of rotation angle in the rotatory material. Therefore, it is difficult for such a wavelength-selective optical device to extract only signal light with a specific wavelength from signal lights which are arranged with an interval of about 0.1 to 1 nm in a wavelength multiplexing optical communication system.

In the device disclosed in Japanese patent application laid-open No. 8-110487, when input light is circularly polarized, elliptically polarized or non-polarized, there is a problem that loss at the polarization separating prism is increased. Also, there is a further problem that loss at the polarization separating prism is varied with time since the polarization state of signal light to be transmitted through the optical fiber is varied with time. Further, the composition is complicated since the number of components is so large.

Also, in all the conventional wavelength-selective optical devices, optical elements, such as an optical filter, need to be mechanically operated. Therefore, it is difficult to obtain a high reliability.

SUMMARY OF THE INVENTION

Accordingly, it is an object of the invention to provide a wavelength-selective optical device where no light loss occurs even when transmitted center wavelength is changed.

It is a further object of the invention to provide a wavelength-selective optical device which has a simple composition and a high reliability in wavelength changing operation.

According to the invention, a wavelength-selective optical device, comprises:

an optical fiber which includes a grating portion where a refractive index of medium is periodically changed;

a light input portion where light is supplied to the optical fiber;

a light output portion where light with a specific wavelength to be output from the optical fiber is taken out; and means for applying a stress to the grating portion.

According to another aspect of the invention, a wavelength-selective optical device, comprises:

an optical fiber which includes a grating portion where a refractive index of medium is periodically changed;

a light input portion where light is supplied to the optical fiber;

a light output portion where light with a specific wavelength to be output from the optical fiber is taken out; and means for applying a stress to the grating portion to control an attenuation quantity of light with the specific wavelength.

BRIEF DESCRIPTION OF THE DRAWINGS

The invention will be explained in more detail in conjunction with the appended drawings, wherein.

DESCRIPTION OF THE PREFERRED EMBODIMENTS

A wavelength-selective optical device in the first preferred embodiment will be explained in FIG. 1.

Figure 1:
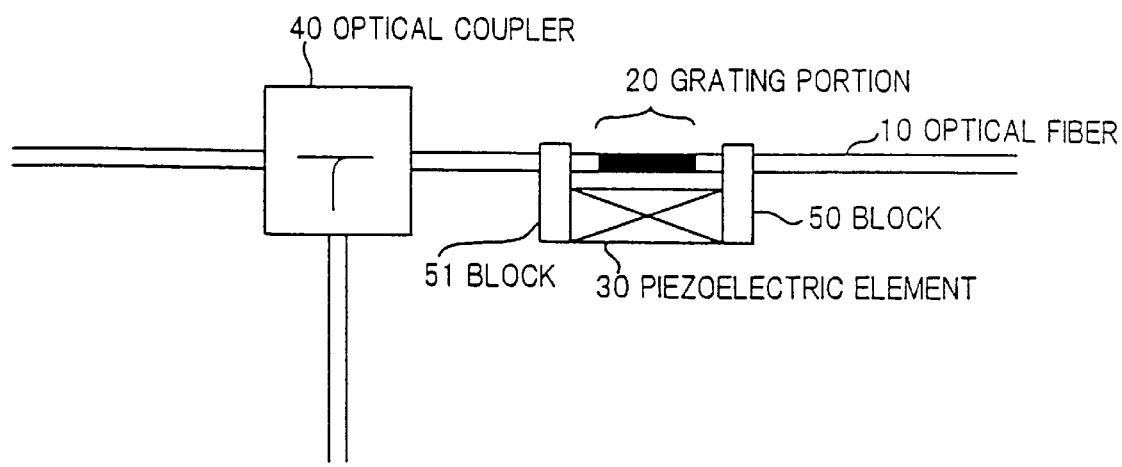
FIG. 1 is an illustration showing a wavelength-selective optical device in a first preferred embodiment according to the invention.

As shown in FIG. 1, the wavelength-selective optical device comprises an optical fiber 10, a grating portion 20 which is partially provided in the optical fiber 10 and has a periodical change of refractive index, a piezoelectric element 30 which is fixed at both ends of the grating portion 20 to apply a stress to the grating portion 20, and an optical coupler 40 which is connected to the optical fiber 10 to take out reflected light from the grating portion 20.

The optical fiber 10 is of a single-mode optical fiber, ad the grating portion 20 is of a fiber grating which is fabricated by periodically dispersing germanium to be doped into the core portion to give the change of refractive index. The piezoelectric element 30 is of piezoelectric ceramic which mainly includes PZT (lead zirconate-titanate). Both the ends of the piezoelectric element 30 are mechanically fixed through blocks 50, 51 to the ends of the grating portion 20. When a voltage is applied to the piezoelectric element 30, a stress occurs in the longitudinal direction of the piezoelectric element 30 and is transmitted through the blocks 50, 51 to the grating 20. The stress applied by the piezoelectric element can be changed by changing the applied voltage. Thus, the reflection wavelength of the grating portion 20 can be changed depending on the level of applied voltage. Light with a specific wavelength to be reflected by the grating portion 20 is taken out by the optical coupler 40 connected to the optical fiber. The optical coupler 40 can be an optical dividing coupler.

Figure 2:
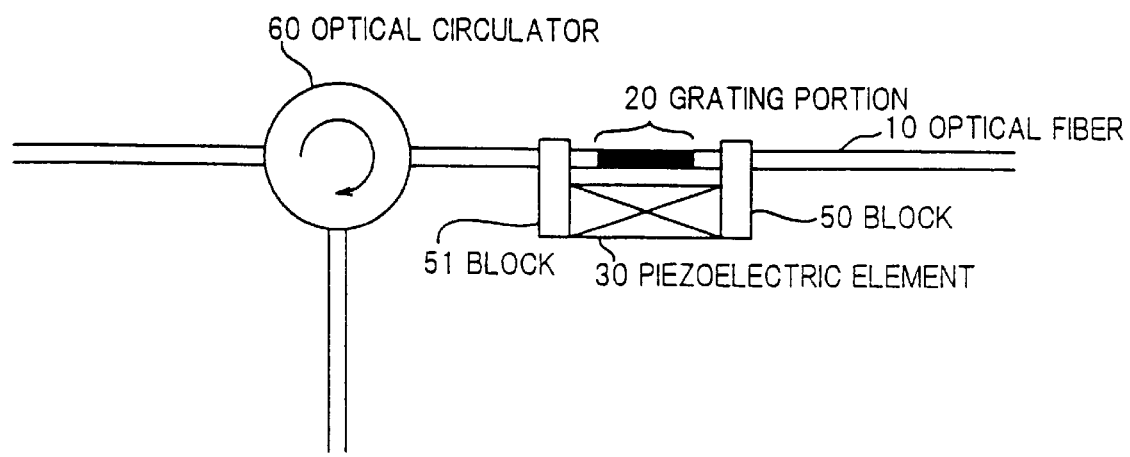
FIG. 2 is an illustration showing a wavelength-selective optical device in a second preferred embodiment according to the invention.

A wavelength-selective optical device in the second preferred embodiment will be explained in FIG. 2. In the second embodiment, the optical coupler 40 in the first embodiment is replaced by a optical circulator 60. In the first embodiment, when the optical coupler 40 is an optical dividing coupler, transmission loss at the optical dividing coupler becomes, in principle, a big value including division loss. In the second embodiment, loss at the transmission line of light can be suppressed to be a low value since it uses the optical circulator 60.

Figure 3:
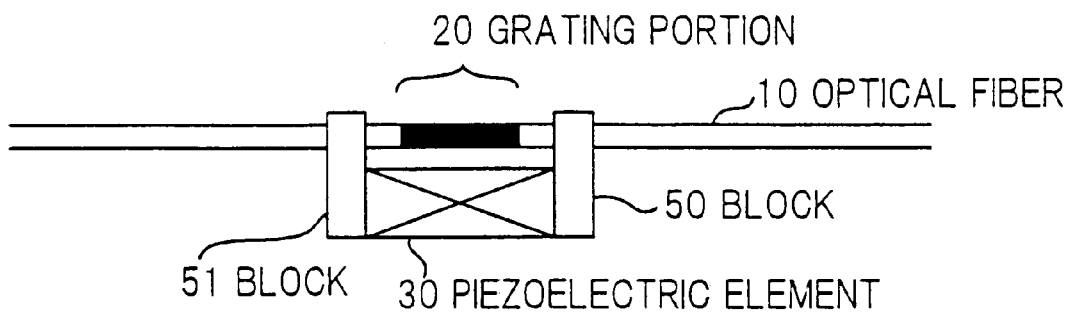
FIG. 3 is an illustration showing a wavelength-selective optical device in a third preferred embodiment according to the invention.

A wavelength-selective optical device in the third preferred embodiment will be explained in FIG. 3. In the third embodiment, the optical coupler 40 in the first embodiment is removed. Namely, in the third embodiment, a variable optical attenuator, which can change optical loss corresponding to a specific wavelength, can be provided as an application of the wavelength-selective optical device in the first embodiment.

When the reflection factor of the grating portion 20 to a specific wavelength is changed by the voltage applied to the piezoelectric element 30, the transmission loss of the grating portion 20 to light with the specific wavelength is changed. Also, when the reflection center wavelength of the grating portion 20 coincides with the specific wavelength to give a maximum reflection factor, the transmission loss of the grating portion 20 to light with the specific wavelength becomes maximum. Thus, by changing the reflection center wavelength of the grating portion 20 by adjusting the voltage applied to the piezoelectric element 30, the transmission loss of the grating portion 20 to the specific wavelength can be changed.

In wavelength multiplexing communication systems, it is desirable that wavelength-multiplexed signal light to be transmitted through the transmission line is composed of signal-light wavelength components which have a common power level. However, since the output power of a signal light source is changed with time, it is difficult to keep the signal-light wavelength components to have a common power level for a long time period. In this case, by inserting the optical attenuator in the third embodiment into the optical fiber transmission line and adjusting the attenuation quantity to a specific wavelength, the levels of the signal-light wavelength components can be kept to be common.

Figure 4:
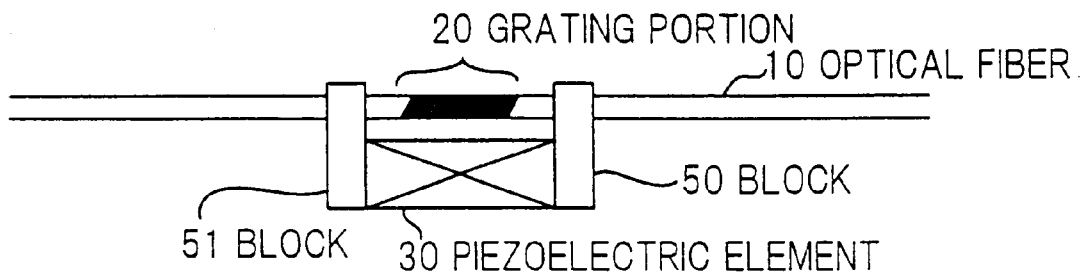
FIG. 4 is an illustration showing a wavelength-selective optical device in a fourth preferred embodiment according to the invention.

A wavelength-selective optical device in the fourth preferred embodiment will be explained in FIG. 4. As shown in FIG. 4, the wave normal of the periodical change of refractive index in the grating portion 20 is inclined to the center axis of the core portion of the grating 20. It can prevent the reflected light from the grating portion 20 from returning to the input end of the optical fiber 10.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A wavelength-selective optical device, comprising:
   an optical fiber which includes a grating portion;
   a light input portion where light is supplied to said optical fiber;
   a light output portion where light with a specific wavelength to be output from said optical fiber is taken out;
   means for applying a stress to said grating portion;
   means for controlling said stress applied to said grating portion by said stress applying means to change a wavelength of light reflected by said grating portion in order to select light with said specific wavelength; and
   an optical coupling means including a first light input and output end connected with said light input portion, and a second light input and output end from which reflected light from said grating portion is taken out, said optical coupling means being an optical circulator which includes said first and second light input and output ends and a third light input and output end, wherein light input to said third light input and output end is output from said first light input and output end and light input to said first light input and output end is output from said second light input and output end, wherein said stress applying means is a piezoelectric element fixed to ends of said grating portion.

2. A wavelength-selective optical device, according to claim 1, wherein:

said piezoelectric element is of piezoelectric ceramic including PZT (lead zirconate-titanate).

3. A wavelength-selective optical device, comprising:

an optical fiber which includes a grating portion where a refractive index of medium is periodically changed;

a light input portion wherein light is supplied to said optical fiber;

a light output portion where light with a specific wavelength to be output from said optical fiber is taken out; and means for applying a desired stress to said grating portion, said desired stress adjusting an attenuation quantity to said specific wavelength of light in such a manner that levels of signal-light wavelength components of said light supplied to said optical fiber is maintained at a constant value.

4. A wavelength-selective optical device, according to claim 3, wherein:

said optical fiber includes a grating portion where a wave normal of said periodical change of refractive index of medium is inclined retaken to the light propagation direction of said optical fiber, whereby at least part of reflected light from said grating portion is discharged out of a core of said optical fiber.

5. A variable optical attenuator, comprising:

an optical fiber including a grating portion, said optical fiber having a light input portion and a light output portion, said light input portion and said light output portion disposed on opposite sides of said grating;

means for applying a stress to said grating portion; and means for controlling said stress applying means, wherein said controlling means controls said stress applying means so that said stress applying means applies a stress in an amount sufficient to change a reflection factor of said grating portion, said change in said reflection factor reducing an optical transmission loss in said optical fiber for a specific wavelength of light.

6. A variable optical attenuator as recited in claim 5, wherein when said stress applying means applies said stress to said grating portion, a reflection center wavelength of said grating portion is adjusted in such a manner that said reflection center wavelength does not coincide with said specific wavelength of light.

* * * * *